United States Patent Office 3,244,882
Patented Apr. 5, 1966

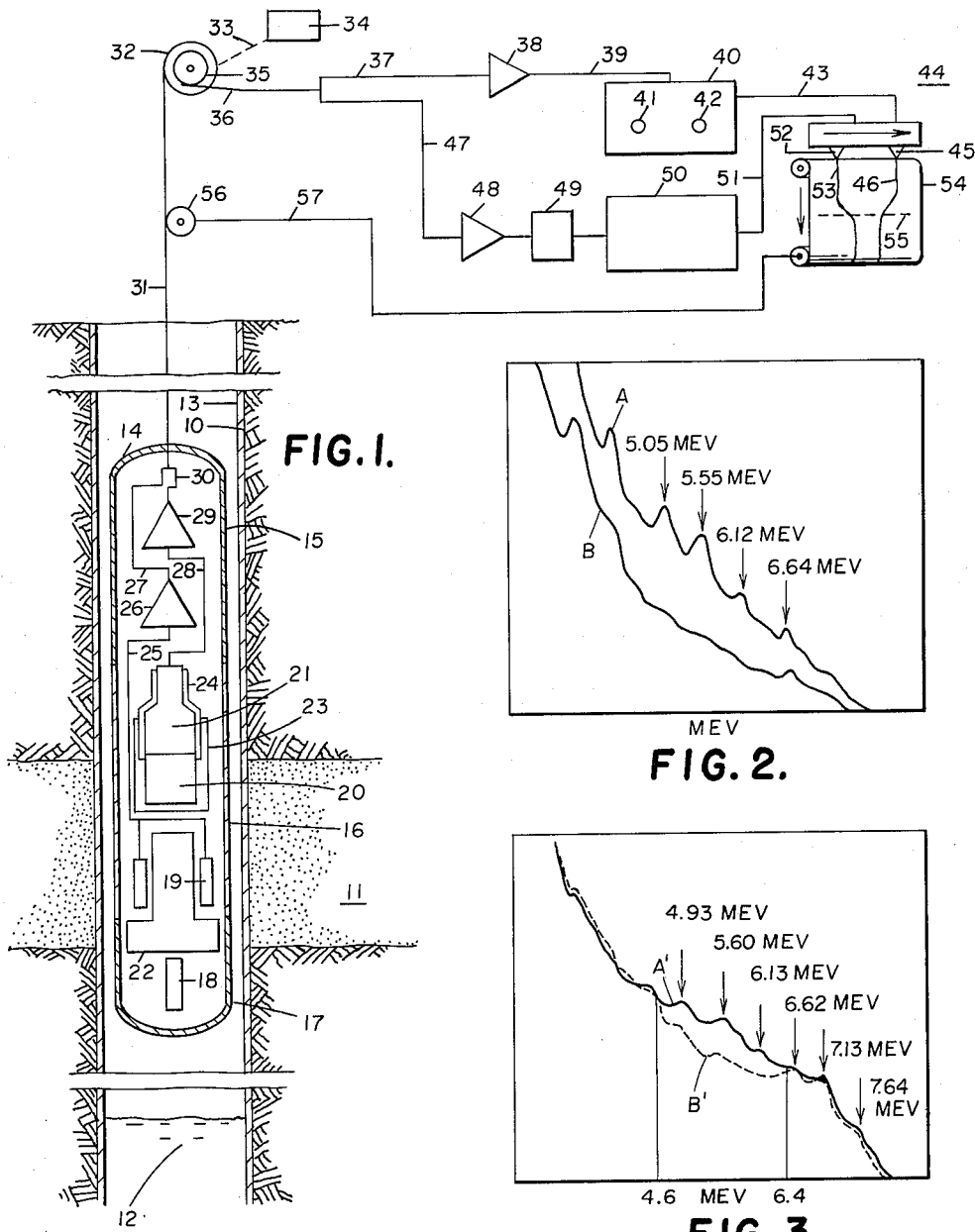

3,244,882
CHLORINE LOGGING SYSTEM USING NEUTRON CAPTURE GAMMA RAYS
Willett F. Baldwin, Dallas, and James E. Berry, Houston, Tex., assignors to Socony Mobil Oil Company, Inc., a corporation of New York
Filed Sept. 25, 1962, Ser. No. 226,039
1 Claim. (Cl. 250—83.3)

The present invention relates to radioactive well logging and more particularly to an improved method of and system for distinguishing between oil and salt water contained within formations traversed by a borehole and has for an object the production of data substantially unaffected by factors otherwise obscuring primary information indicative of the sought-for characteristic of the formations.

In the field of radioactive well logging, it is well known that oil and salt water may be distinguished one from the other by looking for chlorine which appears as sodium chloride dissolved in the water. One method of accomplishing this is to produce simultaneously a thermal neutron log and a neutron-capture gamma ray log. The primary variation of both logs is caused by the porosity of the formations. If chlorine is present, however, the two logs are expected to vary in a relatively inverse manner with respect to one another. This is due to the fact that chlorine, having a large capture cross section for thermal neutrons, will reduce the number of thermal neutrons returning to a suitable detector in the borehole. At the same time the capture of thermal neutrons by the chlorine nuclei will affect a substantial increase in the number of gamma rays returning to the borehole.

There are many factors, however, which prevent the two logs from varying inversely in the expected manner when chlorine is present. One factor is the presence of iron casing in the borehole and another in the presence of borehole liquids containing hydrogen. These factors when taken together affect both the gamma ray log and the neutron log, thereby making it difficult, if not impossible, to determine from the two logs the presence or absence of chlorine.

The gamma rays issuing by reason of capture of thermal neutrons by chlorine nuclei are of substantially high energy. But unfortunately, so are the gamma rays issuing by reason of capture of thermal neutrons by iron nuclei. The energy bands of these gamma rays substantially overlap. Thus, if all of the high energy gamma rays are detected and recorded, the result is meaningless since the iron-capture gamma rays obscure the chlorine-capture gamma rays. This is especially true, for example, at high energies above about 6.4 mev. where prominent neutron-capture gamma rays of iron and chlorine exist. At this energy range it has been found that the integrated count rate of all gamma rays detected in an iron-cased borehole is substantially the same whether the formations logged contain salt water or oil. It is thus obvious that the presence of iron-capture gamma rays reduces materially the variations in the total gamma ray count rate when the logging instrument traverses salt-water saturated and oil saturated formations.

The borehole liquid also will adversely affect the neutron log since the liquid will absorb many of the thermal neutrons coming from the formations, thus preventing them from reaching the detector. In addition, many of the neutrons coming from the formations and having energies above the thermal level prior to entering the borehole will be thermalized in the borehole by the liquid. The count rate of these neutrons thermalized by the borehole liquid does not give the desired information as to the presence or absence of chlorine in the formations. Some of these thermal neutrons, however, will be detected, thereby rendering the neutron log inaccurate as to the quantity of thermal neutrons coming from the formations.

The borehole fluid effect is not as pronounced in the presence of high porosity formations which contain water having a high salt concentration. Under normal formation conditions, however, the effect of the borehole fluid is sufficient to render the readings inaccurate.

In accordance with the present invention, there are provided an improved method of and system for logging for chlorine in the production of a high energy gamma ray and a companion thermal neutron log. In the production of the gamma ray log, there is recorded the intensity of only the neutron-capture gamma rays detected within a predetermined energy range. In one embodiment, this range excludes the high energy neutron-capture gamma rays of iron which tend to obscure those of chlorine. In addition, the effect of the liquid on the neutron log is eliminated completely by removing the liquid from the logging region in the borehole.

More particularly and in accordance with the present invention, the method comprises the steps of passing along an iron-cased borehole a logging tool containing a neutron source to irradiate the formations with neutrons to produce thermal neutrons and neutron-capture gamma rays. At detecting locations in the borehole spaced from the source, there are detected separately the thermal neutrons and gamma rays passing from the formations to the detecting locations by way of a path characterized by the iron of the casing. This path also is free of borehole liquids. Concurrently and in correlation with depth, there are recorded the quantity of thermal neutrons detected and the quantity of gamma rays detected only within the energy range from about 4.6 mev. to an upper limit materially less than 7 mev. in elimination of high energy neutron-capture gamma rays of iron. The presence of salt water in the formations traversed by the borehole is identified by reason of an increase in gamma rays and a decrease in neutrons detected.

In accordance with another aspect of the present invention, the system for obtaining the improved logs includes a logging instrument containing a fast neutron source for irradiating with fast neutrons the formations traversed by an iron-cased borehole to produce thermal neutrons and neutron-capture gamma rays. Also included in the instrument is a thermal neutron detector for detecting the thermal neutrons passing from the formations into the borehole and a gamma ray detector for detecting neutron-capture gamma rays passing from the formations into the borehole. The borehole being logged is open to the atmosphere from the surface of the earth to a point below the desired logging depth. The logging instrument is formed of a nonferrous material at least around the detectors. A discriminating means responsive only to neutron-capture gamma rays detected only within an energy range from about 4.6 mev. to an upper limit materially less than 7 mev. is coupled to the gamma ray detector. A recorder is coupled to the thermal neutron detector and to the discriminating means for recording the intensity of the thermal neutrons detected and the intensity of the neutron-capture gamma rays detected within the above energy range.

For further objects and advantages of the present invention and for a more complete understanding thereof, reference may now be had to the following detailed description taken in conjunction with the accompanying drawings wherein:

FIGURE 1 schematically illustrates the radioactive well logging system of the present invention;

FIGURE 2 illustrates neutron-capture gamma ray spectra of salt-water and oil saturated formations; and FIGURE 3 illustrates neutron-capture gamma ray spectra of salt-water and oil saturated formations traversed by an iron-cased borehole.

Referring now to FIGURE 1 of the drawing, there is disclosed a logging instrument 14 for obtaining radioactive logs of the formations traversed by a borehole 10, which may be cased with iron casing 13. The borehole liquid has been removed at least to a point below the desired logging depth to prevent the liquid from affecting adversely the logging operations as will be described more thoroughly hereinafter.

The logging instrument 14 is supported in the borehole by a cable 31 which is wound and unwound upon a drum 32. A motor 34 drives the drum 32 by way of mechanical connection 33 to move the instrument 14 through the borehole to log for the presence of chlorine which may be in the formation 11.

The presence or absence of chlorine is determined from the variations of a gamma ray log 46 and a thermal neutron log 53 recorded on the chart 54 of a recorder 44 as the instrument 14 traverses the borehole. When chlorine is present in a formation of constant porosity, the two logs are expected to vary inversely with each other; for example, in the manner illustrated above the dotted line 55 on the chart 54. In this example, radioactivity increases toward the right in the direction of the horizontal arrow for both logs.

To obtain the two logs, the instrument 14 is provided with a fast neutron source 18 for irradiating the formations with fast neutrons. Also provided in the instrument 14 are a thermal neutron detector 19 and a gamma ray detector 20 for detecting respectively the thermal neutrons and the neutron-capture gamma rays passing into the borehole from the formations.

The gamma ray detector 20 is coupled to a pulse height analyzer or energy discriminator 40 shown here at the surface which in turn is coupled to the dual pen recorder 44 and comprising the chart 54 driven downwardly past two pens 45 and 52. The neutron detector 19 also is coupled to the recorder 44 by way of count rate meter 50. The two logs or traces 46 and 53 are recorded on the chart 54 by the pens 45 and 52 as the pens are deflected in response to the output from the analyzer 40 and the count rate meter 50.

In operation of the system, the pulse height analyzer 40 is adjusted to be responsive only to the neutron-capture gamma rays detected within a predetermined energy range to obtain the greatest sensitivity. This is done in one embodiment to minimize from the measurements high energy iron-capture gamma rays, as will be described hereinafter. The two logs or functions 46 and 53 recorded thus represent respectively the intensity of the neutron-capture gamma rays detected within the predetermined energy range and the intensity of the thermal neutrons detected.

In accordance with the present invention, the logs or traces 46 and 53 reflect accurately the increased gamma ray density and the corresponding decreased thermal neutron density occurring in the formations upon the capture of thermal neutrons and the emission of gamma rays by chlorine.

The improved results are obtained by reducing substantially the effect of iron and by eliminating completely the effect of borehole liquid, as now will be described. In the construction of the logging instrument 14, at least the middle section 16 of the housing surrounding the detectors is formed of a nonferrous material such as aluminum. Aluminum is a desirable material since thermal neutrons and gamma rays both pass easily through aluminum without the production of undesirable forms of radiation. The top section 15 and the bottom section 17 may be formed respectively of stainless steel and brass.

It is desirable also to have the casing 13 formed of a nonferrous material such as aluminum; however, many of the older wells which are being relogged today have been cased permanently with iron casing. Thus, another solution must be found to eliminate the effect of the high energy neutron-capture gamma rays from this iron. This is carried out, in accordance with the present invention, by adjusting the pulse height analyzer 40 whereby there is recorded the intensity of only the gamma rays detected within the energy range of about 4.6–6.4 mev. The greatest sensitivity can be obtained, when logging in an iron-cased borehole, by recording only within this energy range as disclosed in copending U.S. application Serial No. 79,453, filed December 29, 1960 by R. L. Caldwell and George N. Salaita. The advantages of logging only within this energy range will now be described briefly in connection with FIGURES 2 and 3 which illustrate plots of intensities versus energy of capture gamma rays.

Referring to FIGURE 2, there are illustrated two curves A and B which represent respectively the neutron-capture gamma ray spectra of a salt-water saturated formation and of an oil saturated formation, both formations being free from an iron environment. Curves A' and B' of FIGURE 3 represent the neutron-capture gamma ray spectra respectively of salt-water and oil saturated formations traversed by an iron-cased borehole. As disclosed in the above-identified copending U.S. application, the percentage difference between these curves or the ratio of the area under these respective curves can be used as a measure of the sensitivity or the ability to distinguish between an oil saturated formation and a salt-water saturated formation.

As further disclosed in the above-identified application, iron-capture gamma rays tend to obscure the identification of and intensity measurement of chlorine-capture gamma rays. This is due to the fact that prominent high energy neutron-capture gamma rays of iron overlap those of chlorine, thus tending to obscure their identification. Furthermore, the gamma rays detected having energies beyond certain levels may be those predominantly from the iron of the casing.

As an example of the overlapping energies of the prominent gamma rays of iron and chlorine, prominent gamma rays of iron can be detected at the high energies of around 7.64 mev., 6.03 mev., and 5.93 mev. and those of chlorine can be detected at energies of around 7.41 mev., 6.64 mev., and 6.12 mev. Furthermore, as is well known in the art, gamma rays react with a scintillation crystal to produce three detectable events or spectral peaks as a result of the pair production effect. For example, when the 7.64 mev. gamma rays of iron react with a scintillation crystal, iron spectral peaks can be observed at about 7.64 mev., 7.13 mev., and 6.62 mev. Similarly, chlorine spectral peaks from 7.41 mev. chlorine-capture gamma rays, for example, can be observed at energies of about 7.41 mev., 6.90 mev., and 6.39 mev.

On curve A of FIGURE 2, chlorine spectral peaks are clearly observable at 5.05 mev., 5.55 mev., 6.12 mev., and 6.64 mev. These peaks, however, are not as distinguishable in the presence of iron-capture gamma rays as illustrated by curve A' of FIGURE 3.

The net effect of the iron-capture gamma rays is to reduce the sensitivity or the ability to distinguish between oil and salt-water saturated formations. This is especially true if there is recorded in the production of the gamma ray log the gamma ray intensity at energies above 6.4 mev., and also at energies below about 4.6 mev. This can be understood from a comparison of the difference between curves A and B and the difference between curves A' and B' of FIGURES 2 and 3. When iron-capture gamma rays are not present, the difference between curves A and B is quite large. When iron-capture gamma rays are present, however, the difference is reduced, especially at energies below about 4.6 mev. and above about 6.4 mev. where the two curves A' and B' substantially coincide.

From curves A′ and B′ it can also be understood that the greatest sensitivity will be obtained, when iron is present, by logging only within the energy range of about 4.6–6.4 mev. This is due to the fact that, within this energy range (the upper limit of which may be said to be materially less than 7 mev.), a relatively large difference does exist between curves A′ and B′. The pulse height analyzer 40 is utilized to record the gamma ray intensity detected only within this energy range to obtain increased sensitivity as will be described more thoroughly hereinafter. It is to be noted further that by recording only within the above range, there is eliminated also the effect of hydrogen-capture gamma rays which have energies of about 2.23 mev.

The above discussion relating to the energy range of about 4.6–6.4 mev. has been directed primarily to logging in an iron environment; however, in an environment substantially free from ferrous metals, increased sensitivity can be obtained by logging at energies above about 5 mev. where prominent chlorine-capture gamma rays exist. This can be understood from a comparison of curves A and B of FIGURE 2, wherein the difference between the two curves is quite large at energies above about 5 mev. An environment substantially free from ferrous metals may be found in air or gas drilled boreholes or may be provided by employing a nonferrous casing in the borehole. In addition a logging instrument substantially free of ferrous metals is employed to carry out the logging operations.

In accordance with the other aspect of the present invention, the effect of the borehole liquid on the neutron log can be eliminated completely by removing the liquid from the desired logging region in the borehole. As mentioned previously, the borehole liquid will adversely affect the neutron log since the liquid will absorb many of the neutrons coming from the formations, thus preventing them from reaching the detector. In addition, many of the neutrons coming from the formations and having energies above the thermal level prior to entering the borehole will be thermalized in the borehole by the liquid. The count rate of these neutrons thermalized by the borehole liquid does not give the desired information as to the presence or absence of chlorine in the formations. Some of these thermal neutrons, however, will be detected, thereby rendering the neutron log inaccurate as to the quantity of thermal neutrons coming from the formations.

The borehole liquid removal process can be accomplished prior to the logging operations by a conventional downhole pump (not shown) coupled to the surface by suitable tubing. The liquid is removed at least to a point below the desired logging depth. Below this depth, for example, below formation 11, the liquid 12 may be left in the borehole since it will not affect the logging operations. After the desired amount of liquid is removed, the pump is withdrawn from the bore hole and the logging instrument 14 inserted therein.

With the liquid removed and the borehole open to the atmosphere, the concentration of hydrogen will not exceed that of the air or natural gas which may be present in the borehole. Thermal neutrons from the formations will thus be able to pass freely to the detector 19. This detector is responsive primarily to thermal neutrons as will be described hereinafter. The neutron log thus will reflect more accurately the variations of the intensity of thermal neutrons coming from the formations. Moreover, with the liquid removed, the logging instrument 14 can be moved continuously along the borehole during the logging operations without interference from the liquid.

There now will be described in more detail the system for obtaining the improved chlorine logs described above. Referring to the electrical apparatus illustrated in the logging instrument 14, the neutron detector 19 comprises four boron trifluoride counters placed symmetrically around a shield 22 of lead, although only two counters are shown. These counters are responsive primarily to thermal neutrons. The shield 22 is provided to shield the detectors 19 and 20 from direct radiation emitted from the source 18. The gamma ray detector 20 is a sodium iodide scintillation crystal which is coupled to a photomultiplier tube 21. This detector 20 is spaced from the source 18 at a point where the greatest sensitivity can be obtained in the discrimination between salt-water and oil saturated formations. In an air filled borehole this spacing may be of the order of 15 inches. At this distance the resulting gamma ray log also will be sensitive to changes in porosity. Surrounding the gamma ray detector 20 is a shield 23 which is provided to shield the detector 20 from thermal neutrons. This shield may be formed of powdered boron-10. The photomultiplier tube 21 also is surrounded by a shield 24 of mumetal to shield the tube 21 from variations in the earth's magnetic field.

The gamma ray detector 20 and its associated instrumentation operate in the following manner in the production of the gamma ray log or trace 46. When neutron-capture gamma rays are detected by the detector 20, photomultiplier tube 21 converts the energy of the gamma rays striking the detector into electrical pulses of proportional magnitude. These electrical impulses are applied to amplifier 29 by way of conductor 28 and then to conductor 30 which extends to the surface of the earth through cable 31. At the surface, pulses are taken from conductor 30 by a slip ring and brush arrangement of which only one slip ring 35 and brush 36 are shown. These pulses are applied to the pulse height analyzer 40 by way of conductor 37, amplifier 38, and conductor 39.

The pulse height analyzer 40 is made responsive to the neutron-capture gamma rays only detected within the desired energy range by the adjustment of the low bias control 41 and the high bias control 42. With this adjustment, only the electrical pulses having a magnitude proportional to the energy of the neutron-capture gamma rays detected within the desired energy range will be passed. The pulse height analyzer 40 also includes a count rate meter having an output proportional to the intensity or the integrated count rate of the neutron-capture gamma rays detected within the desired energy range. This output is applied to recorder 44 by way of conductor 43. A connection 57 is provided between a cable measuring element 56 and the recorder 44 to drive the chart of the recorder in correlation with the depth of the instrument 14. The pen 45 thus records a trace 46 which exhibits variations proportional to the variations of the intensity of the neutron-capture gamma rays detected within the desired energy range as the instrument traverses the borehole.

In the production of the neutron log or trace 53, the neutron detector 19 produces electrical pulses at its output upon the detection of thermal neutrons. These pulses are representative of the number of thermal neutrons detected and are applied to the amplifier 26 by way of conductor 25 and then to conductor 27. Pulses are taken from the conductor 27 at the surface by the slip ring and brush arrangement 35 and 36. These pulses are applied by way of conductor 47 and amplifier 48 to an integral discriminator 49. This discriminator is utilized to pass only pulses representative of thermal neutrons detected which have a size or amplitude above a certain level and to exclude all other pulses which may be due to noise, for example. Pulses from the discriminator 49 are applied to the count rate meter 50, the output of which is proportional in magnitude to the integrated count rate of thermal neutrons detected. The output of the count rate meter 50 is applied to the recorder 44 by way of conductor 51. The pen 52 thus records a trace 53 which exhibits variations proportional to the variations of the intensity of the thermal neutrons detected.

In another embodiment of the present invention, the thermal neutron detector 19 may be a Helium-3 proportional counter. Such a counter is disclosed in copending U.S. patent application Serial No. 155,881, filed November 16, 1961 by Tom W. Bonner now Patent No. 3,102,108. As disclosed therein, Helium-3 is employed in a proportional counter at superatmospheric pressures above about two atmospheres absolute. At such pressures the counter can be made highly sensitive to thermal neutrons at low operating voltages and significantly insensitive to gamma rays. The efficiency of such a counter with respect to the detection of thermal neutrons is much greater than that of a conventional boron trifluoride counter. With higher efficiency, greater logging speeds may be maintained thereby minimizing the cost involved in obtaining radioactive logs.

The above description of the invention has been directed to the production of improved logs which reveal the presence of chlorine when the logs vary inversely with each other in a certain manner. Under the same conditions of porosity, however, and if the formation being logged is saturated with oil instead of chlorine, the two logs will vary in a reverse manner from that when the formation is saturated with salt water. This is due to the fact that the constituents of oil, including hydrogen, have a low probability of neutron capture compared with that of chlorine. Thus, when logging in formations which are known to contain a negligible amount of fresh water, the two logs can be used directly to identify the presence of oil and in accordance with the present invention as described above, improved logs are obtained whether the formations being logged are saturated with salt water or with oil.

In one embodiment of the present invention, the source 18 was a plutonium-beryllium source. The boron trifluoride thermal neutron detector was of the type manufactured by N. Wood Counter Laboratory, Chicago, Illinois, No. G16415. The pulse height analyzer 40 was manufactured by Tracerlab, Inc., Richmond, California. This analyzer included an RLA-3 widener and gate generator and an RLA-5S pulse height discriminator coupled to an RLR-7 research count rate meter. The discriminator 49 was an RLA-2S integral discriminator manufactured by Tracerlab, Inc., Richmond, California. The count rate meter 50 was of the type manufactured by Radiation Counter Laboratories, Inc., Skokie, Illinois, Mark 15, Model 15. The duel pen recorder 44 was manufactured by Brown Instrument Division, Minneapolis-Honeywell Regulator Company, Philadelphia, Pennsylvania and included a dual pen strip chart recorder with a selsyn paper drive.

Now that the invention has been described, modifications will become apparent to those skilled in the art and it is intended to cover such modifications as fall within the scope of the appended claim.

What is claimed is:

In a radioactive well logging system for logging for chlorine in the formations traversed by an iron-cased borehole, the combination which comprises a logging instrument containing a fast neutron source for irradiating the formations traversed by said borehole with fast neutrons to produce thermal neutrons and neutron-capture gamma rays, said borehole being free of all liquids and open to the atmosphere from the surface of the earth to a point below the desired logging depth, a neutron detector responsive to thermal neutrons for detecting the thermal neutrons passing from the formations into said borehole, and a gamma ray detector for detecting neutron-capture gamma rays passing from said formations into said borehole, the housing of said instrument being formed of a nonferrous metal at least around said detectors, discriminating means coupled to said gamma ray detector and responsive only to neutron-capture gamma rays detected within an energy range from about 4.6 mev. to an upper limit materially less than 7 mev. and recording means coupled to said thermal neutron detector and to said discriminating means for recording the intensity of the thermal neutrons detected and the intensity of only the neutron-capture gamma rays detected within said energy range.

References Cited by the Examiner
UNITED STATES PATENTS

| | | | |
|---|---|---|---|
| 2,776,378 | 1/1957 | Youmans | 250—83.6 |
| 2,842,675 | 7/1958 | Scherbotskoy | 250—83.6 |
| 2,956,163 | 10/1960 | Baker | 250—83.6 |
| 2,983,817 | 5/1961 | Earley | 250—71.5 |
| 3,102,198 | 8/1963 | Bonner | 250—83.6 |

RALPH G. NILSON, *Primary Examiner.*

JAMES W. LAWRENCE, *Examiner.*